United States Patent [19]
Terminella et al.

[11] Patent Number: 5,167,107
[45] Date of Patent: Dec. 1, 1992

[54] PINCH SEALER DRIVE MECHANISM

[75] Inventors: Emanuele Terminella; Frank Terminella; Joseph Terminella, all of Fayetteville; William Stroud; Joe M. Maynard, both of Farmington, all of Ark.

[73] Assignee: Pacmac, Inc., Fayetteville, Ark.

[21] Appl. No.: 797,224

[22] Filed: Nov. 25, 1991

[51] Int. Cl.⁵ .................. B65B 51/30; B65B 51/14; B65B 9/20
[52] U.S. Cl. .................... 53/551; 53/374.8; 74/110; 156/583.1; 493/206
[58] Field of Search .......... 53/551, 552, 554, 373.7, 53/374.8; 74/110; 156/530, 583.1; 493/206

[56] References Cited

U.S. PATENT DOCUMENTS

| | | | |
|---|---|---|---|
| 2,960,808 | 11/1960 | Pike | 53/551 X |
| 3,256,673 | 6/1966 | Tew et al. | 53/551 |
| 4,243,469 | 1/1981 | Evers et al. | 156/583.1 |
| 4,537,012 | 8/1985 | Groom et al. | 53/552 |
| 4,575,986 | 3/1986 | Willett et al. | 53/551 X |
| 4,622,798 | 11/1986 | Oki | 53/551 X |
| 4,751,808 | 6/1988 | Hadden | 53/551 X |
| 4,872,360 | 10/1989 | Lew et al. | 74/110 |
| 4,996,825 | 3/1991 | Bacon et al. | 53/374.8 X |

*Primary Examiner*—Horace M. Culver
*Attorney, Agent, or Firm*—Robert R. Keegan

[57] ABSTRACT

There is disclosed a pinch sealer drive mechanism for a form fill and seal machine, or the like, wherein a bi-directional rotary actuator is employed to rotate a crank with two oppositely disposed levers, each of which is linked to a slide. Thus, there are two substantially identical symmetrically disposed linkages consisting of a lever, a link and a slide, whereby the slide is caused to have a relatively low velocity at the extremes of its motion, thereby producing a smooth vibration free operating mechanism to which the heat seal bars or other pinch sealing apparatus may be attached. A preferred embodiment of the apparatus has a duplicate of the above described crank, lever, and link mechanism for the distant end of the slide, and the second mechanism is driven from and synchronized with the first by an endless belt drive to one of two sprockets fixed on a rotatable shaft and then from the second sprocket on such shaft to a sprocket connected to rotate the crank of the second mechanism. The actuator for the mechanism is preferably an independently operated pneumatic bi-directional rotary actuator.

15 Claims, 2 Drawing Sheets

PINCH SEALER DRIVE MECHANISM

The present invention relates to reciprocating drive mechanisms such as those used for pinch sealers in packaging machines, particularly form fill and seal packaging machines. Numerous different forms of machines have been developed for packaging food products or other products in a plastic bag in a single operation wherein the bag is formed of sheet material with its edges sealed together to form a tube, which tube passes through a pinch sealing mechanism which cross-seals the tube at intervals to form closed bags which may be cut apart. The product is dropped into the bag between forming the first seal and the second seal at the ends of the bag. Typically the plastic is a thermo-plastic material and the cross-seals made by the pinch sealing mechanism are made by fusing the plastic walls of the bag together with a heater bar which presses against another heater bar or an anvil bar.

The present invention provides a mechanism for reciprocating the elements of the machine such as the heater bars whereby they are moved into proximity to form the heat seal and thereafter moved to a wide separation to allow passage of a filled bag and its contents therebetween.

The apparatus according to the invention is a replacement to and improvement over different forms of apparatus previously employed in packaging machinery. A prime example of such prior apparatus is shown in U.S. Pat. No. 4,040,237 to O'Brien granted Aug. 9, 1977, U.S. Cl. 53/551. The apparatus of O'Brien employed a crank and slide mechanism as does the present invention, but the mechanism was not symmetrical, had a tendency to produce undesirable vibration at high speed, and also created high accelerations at one extreme of travel of the fluid pressure actuator.

Other pinch sealer drive mechanisms for form fill and seal machines are shown in U.S. Pat. No. 4,999,974 to Kovacs, et al, granted Mar. 19, 1991, U.S. Cl. 53/434; U.S. Pat. No. 4,355,494 to Tilman, granted Oct. 26, 1982, U.S. Cl. 53/416.

The improvements represented by apparatus according to the invention are believed to be primarily due to the fact that the mechanism is symmetrical as to reciprocating motion thereby minimizing any unwanted vibration, and due to the fact that the rotary crank motion extends through substantially 180° so that there is inherently a smooth termination at both ends of the alternating crank motion. Rotary motion is used to mechanically transmit forces and displacements to avoid unbalanced dynamic forces.

In addition to providing the above described features and advantages it is an object of the present invention to provide a drive mechanism for a pinch sealer apparatus or the like wherein the pinch sealer heater bars are moved symmetrically by a symmetric crank and slide mechanism.

It is another object of the present invention to provide a drive mechanism for a pinch sealer apparatus or the like wherein the moving elements of the pinch sealer are driven by a crank and slide mechanism having a crank rotating through approximately 180° thereby causing a smooth acceleration or deceleration of the mass of such elements at both extremes of their motion.

It is a still further object of the present invention to provide a reciprocating drive mechanism suitable for a pinch sealer for a form fill and seal machine or the like which is powered by a rotary actuator including multiple fluid pressure cylinders and rack and pinion apparatus, and wherein the moving masses of the apparatus move rotationally or with symmetrical reciprocating motion thereby allowing the apparatus to operate reliably at high speed with minimal vibration.

Other objects and advantages of the present invention will be apparent from consideration of the following description in conjunction with the appended drawings in which.

Figure 1:
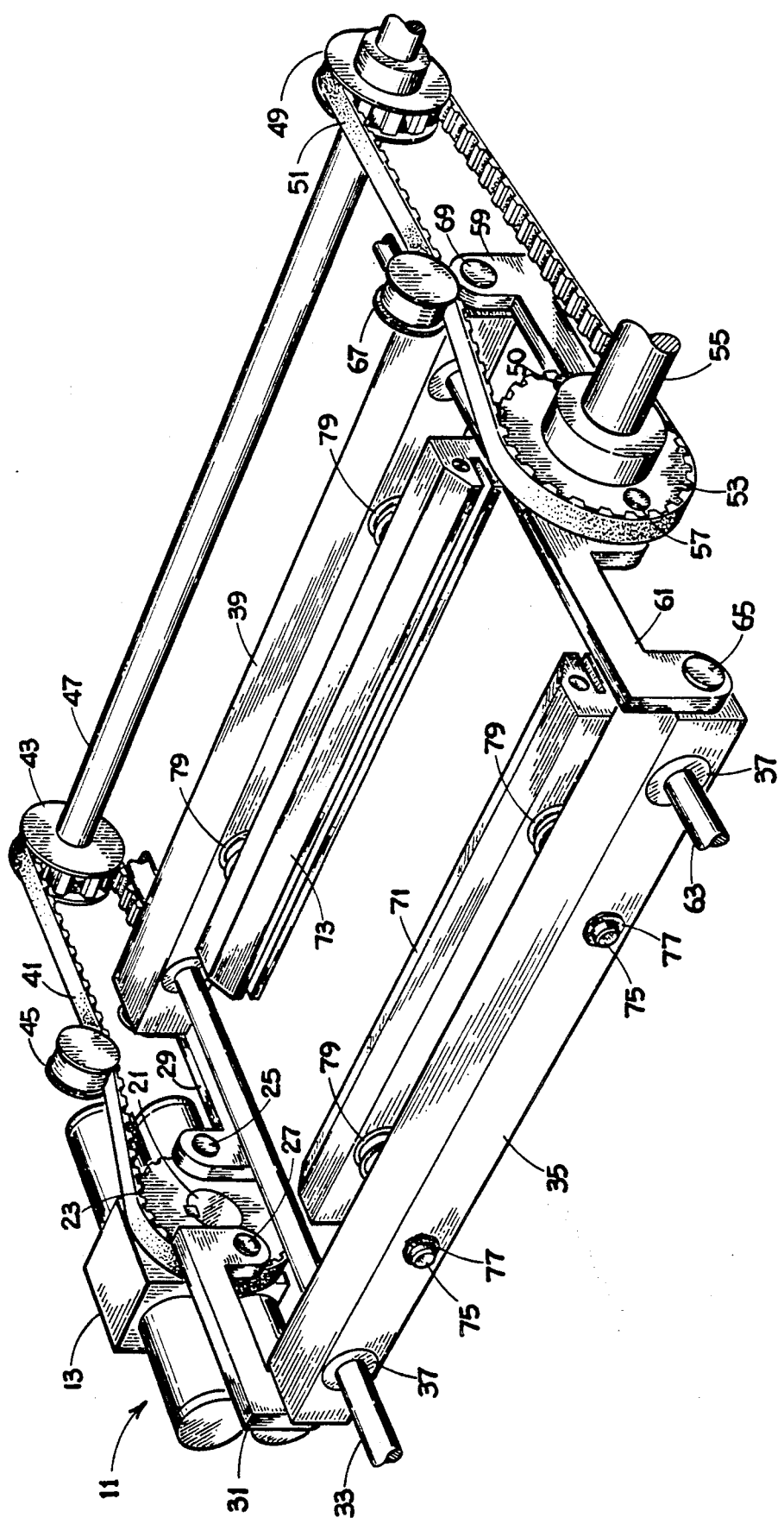
FIG. 1 is a perspective view of a pinch sealer drive mechanism according to the invention.

Referring now to the drawings and particularly FIG. 1, a pinch sealer drive mechanism 11 is shown which is operated under computer control by a rotary actuator 13. As illustrated, the rotary actuator 13 may comprise a two inch bore double rack pneumatic rotary actuator sold under the trademark "BIMBA PNEUTURN". The rotary actuator 13 provides approximately 180° of clockwise or counter-clockwise rotation with up to several hundred inch pounds of torque. Various other forms of rotary actuators including electric motor actuators and other air cylinder actuators are available and may alternatively be utilized for the rotary actuator 13. It will be noted, however, that the double rack mechanism has the advantage that the linear forces involved tend to balance due to the oppositely directed linear motion of the two racks. The pneumatic actuator 13 will be provided with connection to an air pressure source, solenoid valves responsive to electronic signals from the computer control system, and possibly air flow control valves for controlling speed and acceleration of the mechanism, all of which are conventional technology and do not form a part of the present invention.

The rotary actuator 13 is secured in a fixed position in the apparatus and has an output shaft 21 on which is mounted a disc 23 serving as two lever crank, and also as a belt sprocket.

The crank function of disc 23 is implemented by pins 25 and 27 serving as pivots for links 29 and 31. Each of the links 29 and 31 has an offset or dog leg to permit rotation of disc 23 through 180° without interference between link 29 and link 31, as will be more fully explained with reference to FIGS. 2 and 3.

Two fixed slide rods 33 and 63 serve as a track for the reciprocating motions of pinch seal sliders 35 and 39. Low friction bushings or bearings 37 serve to reduce the sliding friction of sliders 35 and 39 on rods 33 and 63. Sliders 35 and 39 are provided with pins 65 and 69 serving as pivot pins to connect one end of slider 35 to link 31 and one end of slider 39 to link 29.

It may be seen in FIG. 1 that sliders 35 and 39 are in their most distant position and that they will be drawn together by clockwise motion of disc 23 and will reach their most proximate position after 180° rotation of disc 23. This will be more fully explained with reference to FIGS. 2 and 3.

An endless toothed belt 41 provides a driving connection between disc 23 and a sprocket 43 mounted on rotatable shaft 47. Shaft 47 is beyond the range of travel of slider 39 and extends to and beyond the opposite end of slider 39 where sprocket 49 is also secured on shaft 47.

Rotation of disc 23 is transmitted by belt 41, sprocket 43, shaft 47, and sprocket 49 through a belt 51 to disc 53 which is rotatably mounted on a fixed shaft 55. Shaft 55 is preferably coaxial with the output shaft 21 of rotary actuator 13; there is provided a link and slider mechanism operated by disc 53 which is an exact counterpart of the mechanism operated by disc 23. Pins 55 and 57 in disc 53 pivotally connect disc 53 to links 59 and 61 respectively. Links 59 and 61 are pivotally connected at their extreme ends by pins 69 and 65 to the near ends of sliders 39 and 35. Belt tensioning means 45 and 67 are provided for the belts 41 and 51 and may be of any conventional form.

Thus it will be seen that disc 53 operates in unison with disc 23 thereby causing the motion of the right ends of sliders 39 and 35 in FIG. 1 to conform to the motion of their left ends.

Connected to the inside faces of sliders 35 and 39 are conventional heater bars 71 and 73 which are secured in place in any suitable fashion, such as by pin 75 secured with C-rings 77. Heater bars 71 and 73 are preferably spaced from sliders 35 and 39 by spacers 79. It will be noted that the positioning of heat sealer heater bars 71 and 73 relative to sliders 35 and 39 may be adjusted so that heater bars 71 and 73 are nearly in contact when sliders 35 and 39 are in their most proximate position. Heater bars 71 and 79 may be fitted in some cases with knives and actuators for cutting the film at the same time the seal is made. Such apparatus forms no part of the present invention and is not shown. The sealing means represented by heater bars 71 and 73 are illustrative only, and any form of sealing apparatus for a pinch sealing operation may be secured in position on sliders 35 and 39.

Figure 2:
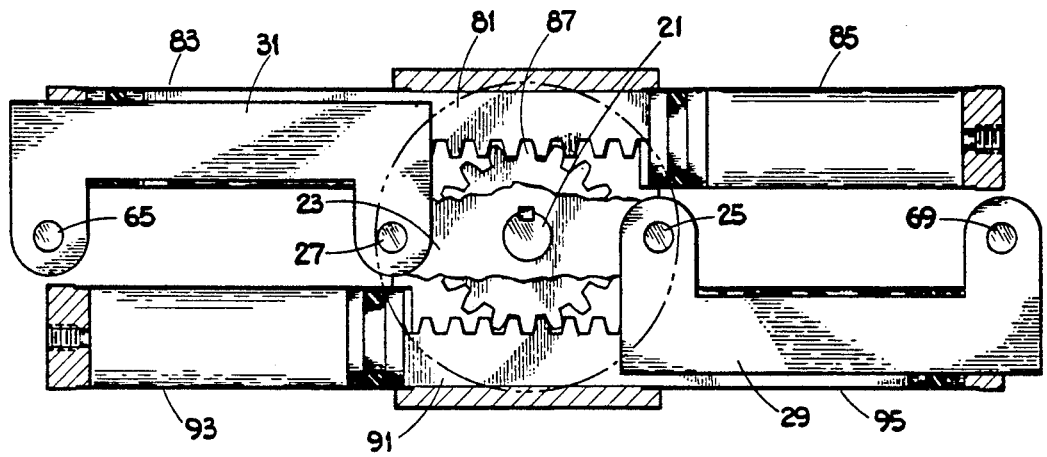
FIG. 2 is a schematic diagram showing the apparatus positioned at one extreme of motion.
Figure 3:
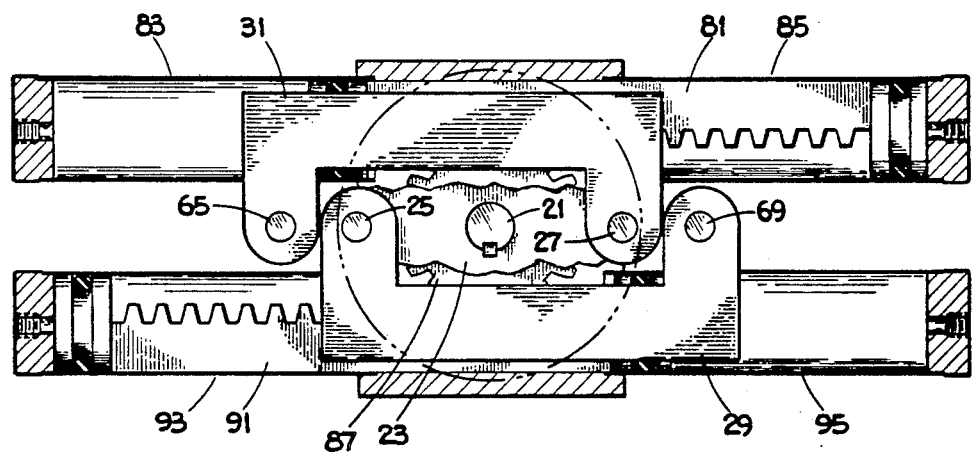
FIG. 3 is a schematic diagram showing the apparatus positioned at the other extreme of motion.

The manner in which the apparatus of FIG. 1 provides rugged, reliable and vibration-free operation of pinch sealer heater bars 71 and 73 may better be understood by reference to FIGS. 2 and 3. FIG. 2 shows the crank, link and slider mechanism of the apparatus in the position of greatest separation for the slider pins 65 and 69 while FIG. 3 shows the crank formed by disc 23 rotated clockwise by 180° to bring the slider pins 65 and 69 to their point of closest approach.

It is very important that the crank formed by disc 23 rotate through substantially 180°. As can be seen by reference to FIGS. 2 and 3 the ratio of the velocity of slider pins 65 and 69 to that of pins 27 and 25 on disc 23 is very low at the initial position shown in FIG. 2, and the velocity ratio increases to almost 1:1 near the midpoint of the 180° travel of disc 23. The ratio of velocity then decreases to the end point of travel of pins 65 and 69 as shown in FIG. 3.

Accordingly, the most massive elements of the apparatus consisting of sliders 35 and 39 and heater bars 71 and 73 will be accelerated smoothly at the start and end of their motion without regard to the particular velocity profile of the rotary actuator 13. It will also be noted that any inconsistency in the end point of rotary travel of disc 23 or any bounce that might occur at the end of its travel has little or no effect on the positioning of the pinch sealer heater bars because of the low velocity ratio of the heater bars relative to disc 23 and pins 25 and 27 at the end points of the travel of the sliders and heater bars. The underlying principle involved in this advantage of the mechanism is of course, well-known, but it is customarily employed only at one end position of travel because the rotary motion of the crack is not 180°. The apparatus of the invention achieves this advantage at both ends of travel with the 180° motion of the crank formed by disc 23 while at the same time maintaining the slider axis through the extended rotation axis of the crank 23 and while avoiding interference between links 31 and 29.

It will also be noted in FIGS. 2 and 3 that the rotary actuator employed is a double bi-directional rack and pinion arrangement with four cylinders 83, 85, 93, and 95 and two racks 81 and 91, all operating on a pinion 87 affixed to shaft 21. Since there is equal and opposite and motion of racks 81 and 91, there is no unbalanced linear motion produced within the actuator. There if, of course, an unbalanced torque produced by the actuator as would be the case with any single rotary actuator. Referring again to FIG. 1 it should be noted that there is equal and opposite motion of the masses associated with slider 35 and masses associated with slider 39 so that there is no unbalanced linear motion in the system, thereby greatly reducing the vibration in the system. In fact, all linear motions are balanced and the transmission of motion from disc 23 to disc 53 is effectuated with vibration free rotary motion.

As shown in FIG. 1 the number of teeth on sprocket 23 is equal to the number of teeth on sprocket 53, and each of sprockets 43 and 49 have just half as many teeth as sprockets 23 and 53. Although any ratios of sprocket teeth on the various sprockets which would result in sprocket 53 being driven at the same speed as sprocket 23 would be workable, the smaller sprockets 43 and 49 help reduce the inertia of the system while still providing a rugged and reliable mechanism.

It should be pointed out that applying the drive torque of rotary actuator 13 directly to disc 23 is primarily a matter of convenient machine layout, and one could equally well drive disc 53 with rotary actuator 13 allowing disc 23 to be driven through belts 51 and 41. As another alternative rather than driving disc 23 or disc 53 one could drive shaft 47 with a rotary actuator having an angular motion of a magnitude proper to produce approximately 180° travel of disc 23 and disc 53.

As a still further alternative, sprockets 43 and 49 could be driven separately by two back-to-back rotary actuators replacing shaft 47. If in that arrangement sprockets 43 and 49 were driven in opposite directions then the reaction torque at the back-to-back rotary actuators would cancel, possibly further reducing any tendency of vibration in the apparatus. If the direction of motion of sprocket 49 and disc 53 were so reversed, then obviously links 61 and 59 would also need to be reversed to avoid interference therebetween.

From the above description it will be seen that the apparatus of the invention implements the reciprocating motion of pinch seal sliders with a mechanical linkage which produces the rapid accelerations for high speed operation that are necessary, and, at the same time, the linkage is so balanced that undesirable vibrations are almost entirely eliminated. Furthermore, the linkage having 180° travel of the crank causes smooth decelerations minimizing shock and further enhancing the smoothness of operation and the durability of the system. The throughput of a form fill and seal machine is often limited by the speed of operation of the pinch sealer and the apparatus of the present invention provides a capability for substantially more than sixty operations per minute with excellent reliability and minimal vibration.

In addition to the numerous variations and modifications to the invention that have been shown, described or suggested, other variations or modifications will be apparent to those of skill in the art, and, accordingly, the scope of the invention is not to be considered limited to those embodiments shown or suggested but is rather to be determined by reference to the appended claims.

What is claimed is:

1. A pinch sealer drive mechanism for a form, fill and seal machine or the like comprising:
   at least two rotationally and coaxially mounted cranks each having first and second lever arms oppositely disposed 180° apart;
   at least two elongated sliders and at least one slider rod for mounting said sliders with substantially colinear motion paths generally perpendicular to the rotational axis of said cranks;
   at least two pairs of links, each pair of said links connecting corresponding ends of said at least two elongated sliders to extremities of said first and second lever arms of a respective one of said cranks, at least one link of each of said pair of links having a dogleg to avoid interference with the other during 180° rotary motion of said crank;
   means for coupling said cranks to rotate in unison;
   means for securing pinch sealing jaws to each of said sliders to cause the jaws to open and close in response to rotary motion of said cranks; and
   a bi-directional rotary actuator coupled to said cranks to cause approximately 180° bi-directional rotation thereof.

2. Apparatus as recited in claim 1 wherein said means for coupling said cranks includes an endless belt drive mechanism having one endless belt for coupling one of said cranks with an intermediate shaft and a second endless belt for coupling the second of said cranks to said intermediate shaft.

3. Apparatus as recited in claim 2 wherein there are two slider rods with one end of each of said sliders mounted on one slider rod and the other end of each of said sliders mounted on the other slider rod.

4. Apparatus as recited in claim 2 wherein each link of each of said pairs of links, each slider, and associated mechanism thereof is of substantially equal mass thereby causing the linear dynamic reaction forces of said mechanism to be balanced.

5. Apparatus as recited in claim 2 wherein said intermediate shaft rotational axis is parallel to and horizontally displaced from the rotational axes of said cranks and wherein each said endless belt is a toothed belt and further including a tensioning roller for each of said endless belts.

6. Apparatus as recited in claim 1 wherein said bi-directional rotary actuator is a fluid pressure rotary actuator with an output shaft directly connected to one of said cranks to cause rotational motion thereof.

7. Apparatus as recited in claim 1 wherein each link of each of said pairs of links and associated mechanism is of substantially equal mass thereby causing the linear dynamic reaction forces of said mechanism to be balanced.

8. A pinch sealer drive mechanism for a form, fill and seal machine or the like comprising:
   a crank mounted on a shaft having levers at positions spaced 180° apart relative to a rotational axis of said shaft;
   two links having first ends connected respectively to each of said levers, at least one of said links having a dogleg to avoid interference with the other during 180° rotary motion of said crank;
   a pair of rod-mounted elongated sliders each having first and second extremities with the first extremities thereof connected respectively to second ends of said links with the rod-mounted elongated sliders being substantially parallel to an extended axis of said shaft and oppositely disposed relative thereto, said sliders most remote relative position corresponding to one extreme of said shaft motion and most proximate position corresponding to the other extreme of said shaft motion;
   the second extremities of said rod-mounted elongated sliders being spaced horizontally from and having a direction of motion parallel to that of said first extremities;
   means for moving said second extremities of said rod-mounted elongated sliders in unison with said first extremities of said rod-mounted sliders;
   pinch sealing means having two bars, each bar being secured to a corresponding slider of said pair of rod-mounted elongated sliders; and
   a bi-directional rotary actuator with at least about a 180° range of motion, said actuator being coupled to rotate said crank through approximately 180° of motion.

9. Apparatus as recited in claim 8 further including a second crank and third and fourth links similar to the first said crank and first said two links, said third and fourth links being connected to the second extremities of said rod-mounted sliders, and wherein said means for moving said second extremities of said rod-mounted sliders includes an intermediate shaft, an endless belt drive mechanism having one endless belt for coupling the first said crank with said intermediate shaft, and a second endless belt for coupling said second crank to said intermediate shaft.

10. Apparatus as recited in claim 9 wherein each of said endless belts is a toothed belt and further including a tensioning roller for said belt.

11. Apparatus as recited in claim 8 wherein said bi-directional rotary actuator is a fluid pressure rotary actuator with an output shaft directly connected to said crank to cause rotational motion thereof.

12. In a form, fill and seal machine, a pinch sealer drive mechanism comprising:
   an independently controlled bi-directional rotary actuator having a shaft with a 180° range of motion;
   a crank coupled to the end of said shaft and having levers at positions spaced 180° apart relative to the axis of said shaft;
   two oppositely disposed links having first ends connected respectively to each of said levers, each said link having a dogleg to avoid interference with the other during 180° rotary motion of said crank;
   a pair of elongated rod-mounted sliders each having first and second extremities with said first extremities connected respectively to second ends of said links with said sliders longitudinal axis generally parallel to the axis of said shaft and said sliders most remote relative position corresponding to one extreme of said shaft motion and most proximate relative position corresponding to the other extreme of said shaft motion;
   the second extremities of said elongated rod-mounted sliders being spaced horizontally from and having a direction of motion parallel to that of said first extremities of said elongated rod-mounted sliders;

means for moving said second extremities of said elongated rod-mounted sliders in unison with said first extremities of said elongated rod-mounted sliders; and pinch sealing means having two bars, each bar having its two ends secured to corresponding extremities of one of said rod-mounted sliders.

13. Apparatus as recited in claim 12 wherein each of said oppositely disposed links and associated mechanism thereof is of substantially equal mass thereby causing the linear dynamic reaction forces of said pinch sealer mechanism to be balanced.

14. Apparatus as recited in claim 13 wherein said bi-directional rotary actuator is a fluid pressure rotary actuator with an output shaft directly connected to said crank to cause rotational motion thereof.

15. In a form, fill and seal machine, a pinch sealer mechanism comprising:

a crank mounted on a shaft and having levers at positions spaced 180° apart relative to the axis of said shaft;

a pair of links each having first ends and second ends with said first ends connected respectively to each of said levers, at least one link having a dogleg to avoid interference with the other during 180° rotary motion of said crank;

a pair of elongated rod-mounted sliders each having first extremities and second extremities and with said first extremities connected respectively to said second ends of said links with the sliders' most remote relative position corresponding to one extreme of said crank motion and their most proximate position corresponding to the other extreme of said crank motion;

a toothed pulley mounted on said shaft to rotate with said crank;

a second shaft mounted with its axis parallel to and widely displaced from that of the first said shaft;

a second toothed pulley fixedly mounted on said second shaft in alignment with the first said toothed pulley;

a belt mounted on and coupling the first said toothed pulley and said second toothed pulley;

a third toothed pulley fixedly mounted on said second shaft substantially axially displaced from said second toothed pulley;

a third shaft mounted with its axis colinear with that of the first said shaft;

a fourth toothed pulley mounted on said third shaft in alignment with said third toothed pulley;

a second belt mounted on and coupling said third toothed pulley and said fourth toothed pulley;

a second crank mounted on said third shaft to rotate with said fourth pulley and having levers at positions spaced 180° apart relative to the axis of said third shaft;

a second pair of links each having first ends and second ends with said first ends connected respectively to each of the last said levers, at least one link of said second pair of links having a dogleg to avoid interference with the other during 180° rotary motion of said second crank;

said second extremities of said pair of rod-mounted sliders being connected respectively to second ends of said second pair of links with the sliders most remote relative position corresponding to one extreme of said second crank motion and most proximate position corresponding to the other extreme of said second crank motion;

an independently controlled bi-directional rotary actuator having a shaft coupled to rotate said cranks through about 180°; and pinch sealing means having two bars, each bar being attached to one of said pair of sliders.

* * * * *